United States Patent [19]

Wallach

[11] Patent Number: 4,992,009
[45] Date of Patent: Feb. 12, 1991

[54] SHEET METAL DRILL BIT

[75] Inventor: Mark Wallach, Markham, Canada

[73] Assignee: Canadian Flexi Drills, Markham, Canada

[21] Appl. No.: 236,175

[22] Filed: Aug. 25, 1988

[51] Int. Cl.5 ............................................. B23B 51/05
[52] U.S. Cl. ..................................... 408/67; 408/204; 408/209
[58] Field of Search ................... 408/67, 68, 211, 213, 408/228, 229, 204, 117–119, 201, 205–209, 703, 214, 212

[56] References Cited

U.S. PATENT DOCUMENTS

| 1,285,350 | 12/1918 | Palmgren | 408/228 |
| 2,628,072 | 2/1953 | Baker | 76/108 R |
| 2,923,180 | 2/1960 | Dunn et al. | 408/68 |
| 3,180,018 | 4/1965 | Hougen | 408/68 X |
| 4,529,341 | 7/1985 | Greene | 408/211 X |

Primary Examiner—Z. R. Bilinsky
Assistant Examiner—Robert Schultz

[57] ABSTRACT

A sheet metal drill bit for drilling burrless round holes in thin products. The drill bit is formed by a solid drill body having a drill head and a connecting shaft. The drill head has two diagonally opposed outer cutting edges in a front face thereof each defining a flute geometry. A stabilizing central drill bit extends from the front face and beyond the outer cutting edge. The cutting edge has an elevated leading edge portion and a downward sloping trailing portion. A concave well is defined between the outer cutting edge and the central drill bit. The trailing portion tapers to at least the front face from which the central drill bit extends and to an angulated web portion. The concave well retains undrilled product pieces about the central drill bit whereas the web portion permits evacuation of loose drilled material.

5 Claims, 1 Drawing Sheet

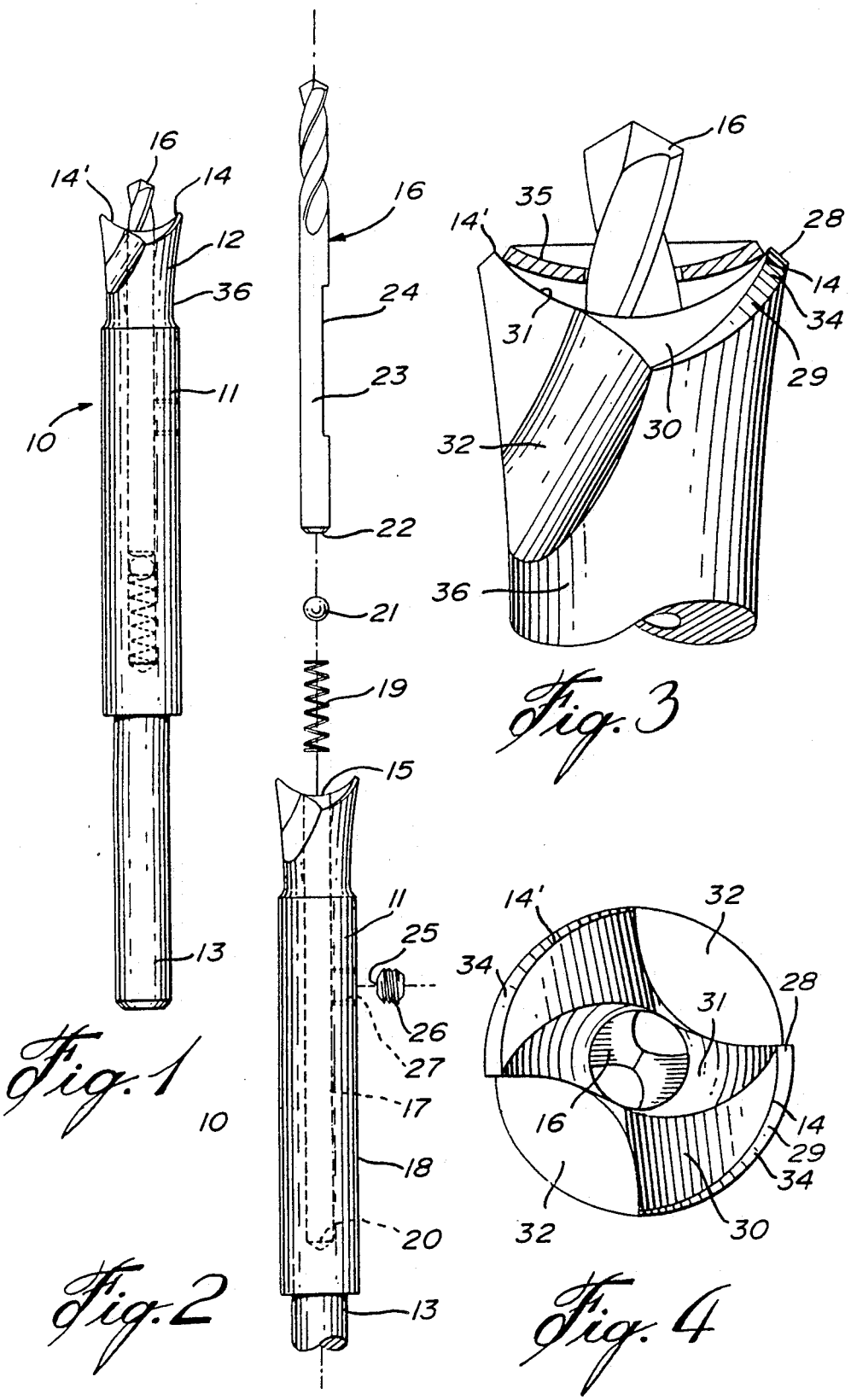

SHEET METAL DRILL BIT

BACKGROUND OF INVENTION

1. Field of Invention

The present invention relates to a sheet metal drill bit for drilling burrless round holes in thin products, such as metal sheets, plastics, etc., and wherein the drill bit has a drill head comprised of an outer cutting edge and a stabilizing central drill bit extending centrally from the front face of the head, and wherein a concave well is defined between the outer cutting edge and the central drill bit.

2. Description of Prior Art

When drilling round holes through a thin layer of material, such as sheet metal or other type sheet material, it is common practice today to utilize hole saws. The drawback of such saws is that they can only drill holes to a minimum of about ¾ inch diameter. When it is necessary to drill smaller holes this may be achieved by specially designed hole saws which are both expensive and unserviceable. An alternative method is to use a conventional fluted drill bit, but these bits wabble and make holes that are distorted and often with very sharp burrs on the side edge of the wall and on both sides of the sheet. It is also known to provide hole cutting saws with a centrally mounted drill with its cutting end extending beyond the plane of the circular series of cutting teeth of an annular tool to guide the annual tool in a more precise manner. Such a cutting saw is disclosed in U.S. Pat. No. 2,926,555.

SUMMARY OF INVENTION

It is a feature of the present invention to provide a novel drill bit for drilling burrless round holes and which consists of a solid drill body having a drill head made with a peripheral outer cutting edge and having a stabilizing central drill bit extending out of the front face and extending beyond the cutting edge, and wherein a concave well is defined between the outer cutting edge and the central drill bit.

Another feature of the present invention is to provide a drill bit, as above described, and wherein the drill head has an outer taper for fast clearance.

Another feature of the present invention is to provide a drill bit, as above described, and wherein the central drill bit is spring-biased within the drill body.

Another feature of the present invention is to provide a drill bit, as above described, wherein the outer cutting edges have a crown which has a small outer taper to eliminate friction.

Another feature of the present invention is to provide a drill bit, as above described, wherein the drill head has an outer taper and wherein there are diagonal outer cutting edges defining a flute geometry.

According to the above features, from a broad aspect, the present invention provides a drill bit for drilling burrless round holes. The drill bit comprises a solid drill body having a drill head and a connecting shaft. The drill head has at least one outer cutting edge in a front face thereof. A stabilizing central drill bit extends from the front face and beyond the outer cutting edge. The cutting edge has an elevated leading edge portion and a downward sloping trailing portion with an inwardly extending cutting surface. A concave well is defined between the outer cutting edge and the central drill bit. The trailing portion tapers to at least the front face from which the central drill extends to an angulated web portion. The concave well retains undrilled metal pieces about the central drill bit whereas the web portion permits evacuation of loose drilled material.

BRIEF DESCRIPTION OF DRAWINGS

A preferred embodiment of the invention will now be described with reference to the accompanying drawings in which:

FIG. 1 is a side view of the improved drill bit of the present invention;
FIG. 2 is an exploded side view of the drill bit;
FIG. 3 is an enlarged side view of the drill head; and
FIG. 4 is a top view of the drill bit.

DESCRIPTION OF PREFERRED EMBODIMENTS

Referring now to the drawings, and more particularly to FIGS. 1 and 2, there is shown generally at 10 the drill bit of the present invention for drilling burrless round holes in sheet metal, plastics sheets, or other materials. The drill bit comprises essentially a solid drill body 11 having a drill head 12 and a connecting shaft 13. The drill head has at least one outer cutting edge 14, herein two diagonal cutting edges 14 and 14', projecting in a front face 15 thereof. A stabilizing central drill bit 16 extends from the front face 15 and projects beyond the outer cutting edges 14 and 14'.

As shown in FIG. 2, the solid drill body 11 has a central elongated bore 17 extending in the enlarged portion 18 for receiving the elongated drill bit 16 therein. A helical spring 19 is located in the cavity or bore 17 and sits on the bottom wall 20 thereof. A ball bearing 21 is seated at the top end of the spring 19 to provide better engagement or seating of the bottom end 22 of the central drill bit 16.

The central drill bit 16 is provided with a shank end portion 23 having a slotted portion 24 to receive an arresting end 25 of a set screw 26 which is threadably engaged in a threaded bore 27 extending transverse to the elongated bore 17 in the drill body 11 whereby to retain the drill bit 16 therein, and cause it to move axially along the length of the slotted portion 24. The set screw also facilitates insertion and removal of the drill bit within the bore 17 when it is necessary to resharpen the cutting edges 14 and 14' of the drill bit.

Referring now additionally to FIGS. 3 and 4, it can be seen that the cutting edges 14 and 14' have an elevated leading edge portion 28 and a downwardly sloping trailing portion 29 with an inwardly extending relieved lip 30. A concave well 31 is defined between the outer cutting edge 14 and the central drill bit 16. The relieved lip 30 slopes to an angulated web portion 32 which follows the curvature of the corresponding cutting edge 14. This web portion 32 has a concavature and permits the evacuation of loose drilled material during a drilling operation through a metal surface. The well portion 31 serves to retain therein the uncut portion or an annular disc portion of sheet metal during a drilling operation.

Because the central drill bit 16 is spring-biased within the solid drill body 11, very little force is applied to the drill to do a start-up hole to stabilize the drill head 12, and substantially only the pressure of the spring 19 is sufficient to drill the first hole. As shown in FIG. 3, the drill 16 protrudes beyond the cutting edges 14' a distance longer than the thickness of the material 35. This permits for a more precise positioning of the stabilizing central drill 16 in a punch hole which is usually made in the sheet metal surface, as is well known to a person skilled in the art. Often, when a hole is drilled a disc of material, such as shown at 35 in FIG. 3, remains embedded within the concave well 31 about the drill bit 16. In order to dislodge this disc 35, the center bit 16 is pushed against a surface offering resistance to cause the drill bit 16 to retract within the elongated bore 17 and dislodge itself from the disc 35 and move behind the disc so as to dislodge the disc from the concave well 31 by simply ejecting it by the force of the spring acting on the drill bit 16 now dislodged from the disc. Thus, the central drill bit also acts as an ejector.

As shown more clearly in FIGS. 3 and 4, the outer cutting edges 14 and 14' may also be provided with a small outer taper 34 to eliminate friction of the side wall 36 of a drill head with the metal piece being drilled through. This is particularly advantageous when the side wall of the drill head is a straight side wall, as shown in FIG. 3. However, as shown in FIG. 1, the side wall 36 may have an outer taper leading to the cutting edges 14 and 14', and this eliminates friction with the edges of a drill hole. The inner cutting surface 30 and the inner well 31 provide a drill head design which eliminates the formation of burrs occurring on the side edge of the hole being drilled on both sides of a metal sheet.

It is within the ambit of the present invention to cover any other obvious modifications, provided such modifications fall within the scope of the appended claims.

I claim:

1. A drill bit for drilling burrless round holes in sheet metal, said drill bit comprising a solid drill body of circular cross-section having a drill head and a connecting shaft, said drill head having two diagonally opposed outer cutting edges in a front face thereof, said cutting edges extending along a respective opposed circumferential segment of said drill head, a stabilizing central drill but located in a central axial bore in said front face and having spring biasing means to bias a drill end portion of said bit outwards of said front face to protrude beyond said outer cutting edges a distance sufficient to penetrate through sheet metal to be drilled, each said cutting edge having a leading edge portion which is elevated from said front face and a downwardly sloping trailing portion, said front face defining a concave wall between outer cutting edges and said central drill bit, said trailing portion extending from said leading edge to an angulated web portion of said drill head, said concave wall retaining an undrilled sheet metal piece about said central drill bit whereas said web portion permits evacuation of loose drilled material during a drilling process.

2. A drill bit as claimed in claim 1 wherein said central drill bit is provided with arresting means in a shank portion thereof to removably secure said drill bit in said central axial bore.

3. A drill bit as claimed in claim 2 wherein said spring-biasing means is a helical spring located in said bore and applying outward pressure on an end of said shank portion when said central bit is disposed in said central elongated bore.

4. A drill bit as claimed in claim 3 wherein said arresting means is a set screw in threaded engagement in a transverse bore disposed in said drill body and communicating with said central elongated bore, said arresting means in said shank portion being a slotted portion for receiving an arresting end of said screw therein and limiting axial displacement of said central drill bit in said elongated bore.

5. A drill bit as claimed in claim 4 wherein said helical spring is seated against a bottom wall of said elongated bore, and a ball bearing seated on a top end of said spring.

* * * * *